(12) United States Patent
Brown et al.

(10) Patent No.: US 11,677,505 B2
(45) Date of Patent: Jun. 13, 2023

(54) WIRELESS COMMUNICATION DEVICES, SYSTEMS AND METHODS FOR DECODING DATA PACKETS FOR THE ESTABLISHMENT OF LATENCY-CRITICAL SERVICES

(71) Applicant: ORANGE, Issy-les-Moulineaux (FR)

(72) Inventors: Patrick Brown, Chatillon (FR); Matha Deghel, Chatillon (FR); Salah Eddine El Ayoubi, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 75 days.

(21) Appl. No.: 17/046,932

(22) PCT Filed: Apr. 8, 2019

(86) PCT No.: PCT/FR2019/050819
§ 371 (c)(1),
(2) Date: Oct. 12, 2020

(87) PCT Pub. No.: WO2019/197767
PCT Pub. Date: Oct. 17, 2019

(65) Prior Publication Data
US 2021/0050945 A1    Feb. 18, 2021

(30) Foreign Application Priority Data

Apr. 13, 2018  (FR) ........................................ 1853254
Jun. 22, 2018  (FR) ........................................ 1855547

(51) Int. Cl.
*H04L 1/1607*  (2023.01)
*H04L 5/00*    (2006.01)
(Continued)

(52) U.S. Cl.
CPC .......... *H04L 1/1621* (2013.01); *H04L 5/0037* (2013.01); *H04L 5/0044* (2013.01);
(Continued)

(58) Field of Classification Search
None
See application file for complete search history.

(56) References Cited

U.S. PATENT DOCUMENTS 6,298,052 B1    10/2001   Bousquet et al.
2018/0123765 A1*  5/2018  Cao ........................ H04L 1/1861
(Continued)

FOREIGN PATENT DOCUMENTS

EP      0863621 A1    9/1998
WO   2018086707 A1    5/2018

OTHER PUBLICATIONS

Author Unknown, Uplink grant free transmission for URLLC services, pp. 1-7, Feb. 17 (Year: 2017).*
(Continued)

*Primary Examiner* — Christopher M Crutchfield
(74) *Attorney, Agent, or Firm* — David D. Brush; Westman, Champlin & Koehler, P.A.

(57) ABSTRACT

Wireless communication devices, systems, and methods for decoding data packets for establishing latency-critical services. Each mobile station transmits multiple copies of a same data packet over a contention-based multiple access uplink channel without prior reservation of resources. Then, for a given mobile station, copies of a data packet are transmitted over identified resources of the channel, in a sequence known to the base station. Thus, for each mobile station, the base station knows which channel resources to look at in order to perform its decoding in a facilitated manner.

14 Claims, 4 Drawing Sheets

(51) Int. Cl.
*H04W 28/06* (2009.01)
*H04W 72/21* (2023.01)
*H04W 72/541* (2023.01)
*H04W 74/08* (2009.01)

(52) U.S. Cl.
CPC .......... *H04W 28/06* (2013.01); *H04W 72/21* (2023.01); *H04W 72/541* (2023.01); *H04W 74/08* (2013.01)

(56) References Cited

U.S. PATENT DOCUMENTS

| | | | |
|---|---|---|---|
| 2019/0069200 A1* | 2/2019 | Zhang | H04W 72/02 |
| 2019/0200352 A1* | 6/2019 | Hosseini | H04L 1/08 |
| 2020/0146026 A1* | 5/2020 | Shimezawa | H04W 74/08 |

OTHER PUBLICATIONS

G. Interdonato, S. Pfletschinger, F. Vazquez-Gallego, J. Alonso-Zarate, G. Araniti, Intra-Slot Interference Cancellation for Collision Resolution in Irregular Repetition Slotted ALOHA, pp. 1-6, (Year: 2015).*

Author Unknown, Remaining essential issues on grant free, pp. 1-3, Mar. 2 (Year: 2018).*

English translation of the Written Opinion of the International Searching Authority dated Jun. 19, 2019 for corresponding International Application No. PCT/FR2019/050819, filed Apr. 8, 2019.

International Search Report dated Jun. 12, 2019 for corresponding International Application No. PCT/FR2019/050819, filed Apr. 8, 2019.

Written Opinion of the International Searching Authority dated Jun. 12, 2019 for corresponding International Application No. PCT/FR2019/050819, filed Apr. 8, 2019.

Jiawei Ren et al. "Complex Step-Shape Binary Offset Carrier Modulation for a Unitary Analytical Framework of GNSS Signals" Wireless Personal Communication, Boston, Oct. 1, 2013 (Oct. 1, 2013), pp. 1915-1934, Retrieved from the Internet: http://complextoreal.com/wp-content/uploads/2013/01/CDMA.pdf retrieved on Feb. 14, 2019 DOI: 10.1007/s11277-013-1113-0, XP055525511.

Ren Bin et al., "Pattern Matrix Design of PDMA for 5G UL Applications" China Communications, vol. 13, No. Supplement 2, Feb. 29, 2016 (Feb. 29, 2016), pp. 159-173, DOI: 10.1109/CC.2016.7833470, ISSN: 1673-5447, XP011639770.

* cited by examiner

WIRELESS COMMUNICATION DEVICES, SYSTEMS AND METHODS FOR DECODING DATA PACKETS FOR THE ESTABLISHMENT OF LATENCY-CRITICAL SERVICES

CROSS-REFERENCE TO RELATED APPLICATIONS

This Application is a Section 371 National Stage Application of International Application No. PCT/FR2019/050819, filed Apr. 8, 2019, which is incorporated by reference in its entirety and published as WO 2019/197767 A1 on Oct. 17, 2019, not in English.

TECHNICAL FIELD

The present invention relates to the field of decoding data packets transmitted over resources of a contention-based multiple access uplink radio channel without prior reservation of resources. More specifically, it relates to wireless communication devices, systems, and methods for the establishment of latency-critical services.

PRIOR ART

The IMT-2020 standard defines the structure of the fifth generation of mobile networks. This standard is intended to be structured around several major functions including latency-critical services such as ultra-reliable low-latency communications (URLLC). Latency-critical services include all applications requiring extremely high responsiveness as well as a very strong guarantee of packet transmission. These needs are primarily found in transportation (for example autonomous vehicles, drones), in medicine (for example remote surgery via medical robots), and generally in the fields of industry digitalization.

In practice, a latency of only 1 ms may be required for latency-critical services. For comparison, the latency in a fourth generation mobile network is about 50 to 100 ms. As a reminder, latency corresponds to the delay that can be attributed to the cellular network itself between two sources.

It is envisioned that such latency-critical services established between a base station and numerous mobile stations can be implemented via a contention-based multiple access radio channel without prior reservation of the channel's resources.

In this case, the base station must be able to decode the data packets associated with these numerous mobile stations, while respecting the latency constraints of the latency-critical services. However, currently the latency constraints of latency-critical services do not allow supporting a large number of mobile stations. Indeed, some of the current systems require supporting a very low load, for example by limiting the number of mobile stations or by limiting their transmission rate. Other systems are inefficient, requiring the use of a very large amount of resources.

It is therefore appropriate to propose a solution that facilitates decoding by the base station within a context of the establishment of latency-critical services, while supporting a high number of mobile stations.

SUMMARY OF THE INVENTION

The present invention therefore aims to solve the above problem.

To do so, in a first aspect of the invention, a wireless communication system is provided comprising at least a first base station. The system also comprises a plurality of mobile stations, each mobile station being configured to establish a latency-critical service with the first base station. Lastly, the system also comprises a contention-based multiple access uplink channel without prior reservation of resources, the uplink channel comprising a plurality of resources. According to the invention, the communication system is configured such that each mobile station is associated with a specific sequence, each sequence defining a portion of the plurality of resources of the uplink channel. Furthermore, each mobile station is further configured to transmit, to the first base station, a plurality of copies of a data packet according to the associated sequence. Finally, the first base station is configured to decode, for each mobile station, at least one resource according to the associated sequence.

An advantage of the invention is that, due to knowing the resources in which each mobile station will transmit, it is possible to facilitate the decoding operation of the base station, and to do so while satisfying the latency constraints of latency-critical services. In addition, the invention allows satisfying the latency constraints of latency-critical services in systems where the load is high.

According to a first implementation of the first aspect of the invention, each mobile station comprises a first memory storing the associated sequence, the associated sequence being predetermined. In addition, the first base station comprises a second memory storing the associated sequence for each mobile station.

With such an implementation, it is possible to directly use all of the mobile stations and a first base station when commissioning the system.

According to a second implementation of the first aspect of the invention, the first base station is further configured to determine the associated sequence for each mobile station, and to transmit the associated sequence to each mobile station. Furthermore, each mobile station is further configured to receive, originating from the first base station, the associated sequence.

With such an implementation, it is possible to define the sequences dynamically according to the environment of the system.

In a first example of the second implementation of the first aspect of the invention, the first base station is further configured to randomly determine the associated sequence of each mobile station.

With such an implementation, it is possible to increase the decoding probability of the first base station.

In a second example of the second implementation of the first aspect of the invention, the first base station is configured to determine the associated sequence of each mobile station according to a sequence determination method satisfying at least one condition in which there is only one resource in common between two sequences.

Satisfying this condition on determining the sequences specific to the mobile stations thus makes it possible to minimize the probability that emissions from the mobile stations according to their respective sequence will collide.

In a third example of the second implementation of the first aspect of the invention, the system further comprises a second base station of the same type as the first base station. Furthermore, the system is further configured such that, during a transfer of the uplink channel between the first base station and the second base station, for at least one mobile station, the first base station base is further configured to transmit the associated sequence of the mobile station to the second base station.

With such an implementation, it is possible for a mobile station to use the same sequence after a change of cell in the system.

According to a third implementation of the first aspect of the invention, the system is further configured such that the first base station is further configured to be synchronized with the plurality of mobile stations. Moreover, the plurality of mobile stations is further configured to define a predetermined cyclic transmission time.

With such an implementation, it is possible to schedule the decoding at the end of each transmission cycle.

According to a fourth implementation of the first aspect of the invention, each mobile station is further configured to define an acyclic transmission time. Furthermore, the system is further configured such that each mobile station is further configured to carry out the transmission of the plurality of copies of the data packet within a plurality of time intervals having a predetermined duration. Then, the first base station is further configured to store the data packets received over all resources of the uplink channel, and to perform the decoding, within a current time interval, based on the data packets received during the predetermined duration preceding the current time interval.

With such an implementation, it is possible to take into consideration unordered transmissions from the mobile stations.

According to a fifth implementation of the first aspect of the invention, the system is further configured such that resources of the uplink channel are reserved. Furthermore, the first base station is further configured to receive, originating from the plurality of mobile stations, over the reserved resources of the uplink channel, at least one transmission code, and to determine, from the transmission code received, the mobile station for which the subsequent transmission is intended. Then, each mobile station is further configured to transmit the received transmission code to the first base station, over the reserved resources of the uplink channel, before transmission of the plurality of copies of the data packet.

With such an implementation, it is possible to notify the first base station of the occurrence of future transmissions.

According to a sixth implementation of the first aspect of the invention, the system is further configured such that the first base station is further configured to decode, for each mobile station, a combination of all or part of the resources of the associated sequence.

With such an implementation, it is possible to use several copies of a same data packet to decode it successfully.

According to a sixth implementation of the first aspect of the invention, the system is further configured such that the first base station is further configured to apply a successive interference cancellation technique according to the associated sequence, after decoding.

With such an implementation, it is possible to subtract from colliding resources the data packets which have been successfully decoded.

In a second aspect of the invention, a base station is provided for establishing a latency-critical service with a plurality of mobile stations, each mobile station being configured to communicate with the base station via a contention-based multiple access uplink channel without prior reservation of resources, the uplink channel comprising a plurality of resources. According to the invention, the base station comprises a calculation unit for decoding, for each mobile station, at least one resource according to an associated specific sequence. In particular, the associated sequence defines a portion of the plurality of resources of the uplink channel, and the resources on which each mobile station is further configured to transmit a plurality of copies of a data packet to the base station.

According to a first implementation of the second aspect of the invention, the base station further comprises a memory storing the sequence associated with each mobile station.

According to a second implementation of the second aspect of the invention, the calculation unit is further configured to determine the associated sequence for each mobile station, and the base station further comprises a transmission unit for transmitting the associated sequence to each mobile station.

According to one particular embodiment of the second aspect of the invention, the calculation unit is further configured to determine the associated sequence for each mobile station according to a sequence determination method satisfying at least one condition in which there is only one resource in common between two sequences.

In a third aspect of the invention, a mobile station is provided for establishing a latency-critical service with a base station via a contention-based multiple access uplink channel without prior reservation of resources, the uplink channel comprising a plurality of resources. According to the invention, the mobile station comprises a transmission unit for transmitting to the base station a plurality of copies of a data packet according to an associated specific sequence, the associated sequence defining a portion of the plurality of resources of the uplink channel.

In a fourth aspect of the invention, a wireless communication method implemented by a base station is provided, for establishing a latency-critical service with a plurality of mobile stations, each a mobile station being configured to communicate with the base station via a contention-based multiple access uplink channel without prior reservation of resources, the uplink channel comprising a plurality of resources. According to the invention, the following steps are implemented:

associating each mobile station with a specific sequence defining a portion of the plurality of resources of the uplink channel, receiving, from each mobile station, a plurality of copies of a data packet according to the associated sequence, and decoding, for each mobile station, at least one resource according to the associated sequence.

According to one particular embodiment, a sequence specific to each mobile station is determined according to a sequence determination method satisfying at least one condition in which there is only one resource in common between two sequences.

Thus, the sequences are determined such that the probability is minimized of collision of the transmissions from the mobile stations according to their respective sequence.

In one exemplary embodiment of such a determination of sequences, the sequence determination method determines a number $n1*n2$ of sequences by combining a first set of sequences $n1$ comprising s resources selected from a number $m=n/k$ of resources and satisfying the condition in which there is only one resource in common between two sequences, with a second set of sequences $n2=k*k$ comprising s resources among a number $k*s$ of resources in order to construct sequences comprising s resources among n resources, where k is a prime number greater than or equal to s−1.

This method makes it possible to obtain, in a simple manner, a large number of specific sequences for a large number of resources satisfying the condition in which there is only one resource in common between two sequences.

BRIEF DESCRIPTION OF DRAWINGS

Other features and advantages of the invention will be better understood by reading the following description and referring to the accompanying drawings, provided for illustrative purposes and in no way limiting.

FIGS. 4a, 4b and 4c illustrate an example of determining specific sequences according to a sequence determination method of one embodiment of the invention For clarity, the elements shown are not to scale relative to one another, unless stated otherwise.

DESCRIPTION OF EMBODIMENTS

The general principle of the invention is based on two aspects. First, each mobile station transmits multiple copies of a same data packet over a contention-based multiple access uplink channel without prior reservation of resources. Then, for a given mobile station, the copies of a data packet are transmitted over identified resources of the channel, in a sequence known to the base station. Thus, for each mobile station, the base station knows which channel resources to look at in order to perform its decoding in a facilitated manner.

In the description, the invention will be described with reference to URLLC ("ultra-Reliable Low-Latency Communication") communications as envisioned in the fifth generation of mobile networks. However, the invention is also more generally applicable to latency-critical services.

Figure 1:
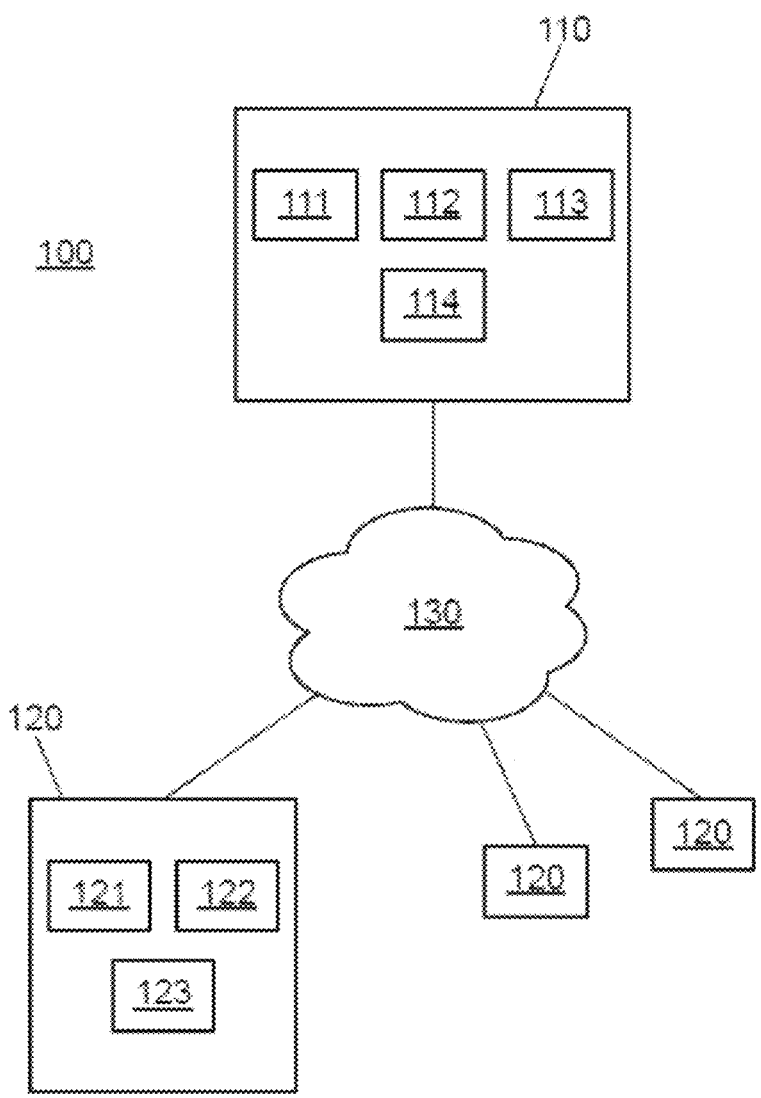
FIG. 1 shows a system according to the invention.

FIG. 1 illustrates a wireless communication system 100 according to the invention. The system 100 comprises a base station 110, several mobile stations 120, and an uplink radio channel 130 with contention-based multiple access without prior reservation of resources. In one particular implementation, the system 100 comprises several base stations 110.

In the example of FIG. 1, the base station 110 comprises at least a transmission unit 111 and a reception unit 112. In one example, the transmission unit 111 is a radio transmitter and the receiving unit 112 is a radio receiver.

In the example of FIG. 1, each mobile station 120 comprises at least a transmission unit 121 and a reception unit 122. In one example, the transmission unit 121 is a radio transmitter and the reception unit 122 is a radio receiver. Additionally, each mobile station 120 is configured to establish a latency-critical service with the base station 110.

In the example of FIG. 1, the uplink channel 130 comprises a plurality of radio resources. In one example, the channel resources are two-dimensional time/frequency resources comprising a plurality of symbol durations in a time dimension and a plurality of sub-carriers in a frequency dimension. In another example, the resources are carrier frequencies, time slots, or orthogonal codes.

In FIG. 1, when the system 100 is in operation, it is configured so that each mobile station 120 is associated with a sequence of resources of the uplink channel 130, which is specific to it. In addition, each sequence defines a portion of the plurality of resources of the uplink channel 130. The specific character of the sequence of resources associated with a mobile station 120 implies that each mobile station 120 is associated with a particular sequence of resources. In addition, this also covers the fact that several mobile stations 120 are associated with the same particular sequence of resources.

Figure 2:
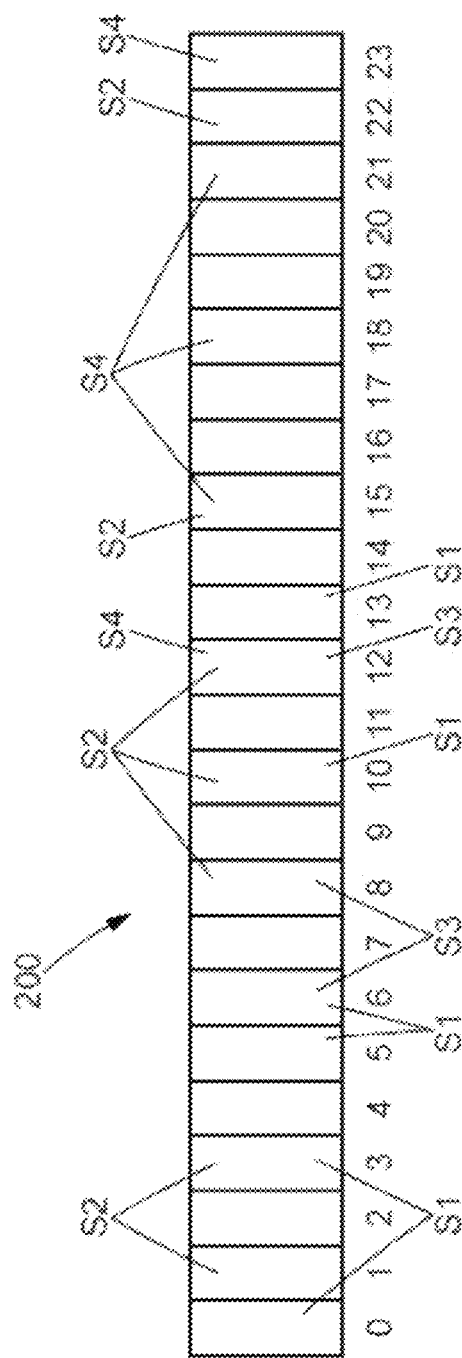
FIG. 2 shows an implementation of the resources of the uplink channel of FIG. 1, and four sequences of resources.

FIG. 2 illustrates an example of resources 200 of the uplink channel 130 and four sequences of resources S1, S2, S3 and S4, defined according to the invention. Sequence S1 comprises the resources 0, 3, 5, 6, 10 and 13. Sequence S2 comprises the resources 1, 3, 8, 10, 12, 15 and 22. Sequence S3 comprises the resources 6, 8 and 12. Finally, sequence S4 comprises the resources 12, 15, 18, 21 and 23. In the example of FIG. 2, one will note that the sequences S1, S2, S3 and S4 do not comprise the same number of resources. However, in one particular implementation, some or all of the sequences comprise the same number of resources. In addition, in the example of FIG. 2, one will note that the sequences have certain resources in common. This is the case, for example, for resource 6 found in sequences S1 and S3, or resource 15 found in sequences S2 and S4. However, in one particular implementation, when the number of resources so permits, each sequence defines a unique list of resources.

In a first particular implementation of the invention, the sequence associated with each mobile station 120 is predetermined. For example, the sequence associated with each mobile station 120 is predetermined during commissioning of the mobile station 120 and/or of the base station 110. In this first implementation, each mobile station 120 comprises a first memory 123 storing the associated sequence. In addition, the base station 110 comprises a second memory 113 storing the sequence associated with each mobile station 120.

In a second particular implementation of the invention, the sequence associated with each mobile station 120 is determined by the base station 110. In this implementation, the base station 110 comprises a calculation unit 114 for determining the associated sequence for each mobile station 120. In one example, the calculation unit 114 is a processor. In addition, the transmission unit 111 of the base station 110 is configured to transmit the associated sequence to each mobile station 120. Furthermore, the receiving unit 122 of each mobile station 120 is further configured to receive the associated sequence, originating from the base station 110.

In one example of the second particular implementation, the calculation unit 114 of the base station 110 is further configured to randomly determine the sequence associated with each mobile station 120.

In another example of the second implementation, the calculation unit 114 of the base station 110 is further configured to determine the sequence associated with each mobile station 120 according to a sequence determination method satisfying at least one condition in which there is only one resource in common between two sequences. Such a sequence determination method is described below with reference to FIGS. 4a to 4c.

In another example of the second particular implementation, we consider the case where the system 100 is a cellular communication system, in which a process is provided whereby a mobile station 120 can change its radio channel while maintaining a call in progress. Such a channel transfer process is commonly called a "handover". In this case, the system 100 comprises at least two base stations 110 which are interconnected, for example via a network interface of the system 100. Furthermore, the system 100 is further configured such that, during handover of the uplink channel 130 between a first base station 110 and a second base station 110, for at least one mobile station 120, the first base station 110 is further configured to transmit, to the second base station 110, the sequence associated with the mobile station 120.

Returning to FIG. 1, each mobile station 120 is further configured to transmit to the base station 110 a plurality of copies of a data packet according to the associated sequence. In one example, with reference to FIG. 2, a mobile station 120 associated with sequence S2 will transmit at least two copies of a data packet on at least two resources among the resources 1, 3, 8, 10, 12, 15 and 22. In one implementation of this example, the mobile station 120 associated with sequence S2 will transmit seven copies of a data packet, using the set of resources 1, 3, 8, 10, 12, 15 and 22.

In FIG. 1, the base station 110 is configured to decode, for each mobile station 120, at least one resource 200 according to the associated sequence. In the example mentioned above, the base station 110 knows that a mobile station 120 is associated with sequence S2, so the base station 110 will decode at least one of the resources 1, 3, 8, 10, 12, 15 and 22. Thus, for the mobile station 120 of the example, it will not be necessary to decode all of the resources 200 of the uplink channel 130.

In one particular implementation, the base station 110 is further configured to decode, for each mobile station 1120, a combination of some or all of the resources 200 of the associated sequence. This implementation may be necessary when the sequence resources associated with a mobile station 120 collide with data packets from other mobile stations 120. This means that it was not possible to decode the data packet based on one of the mentioned resources in the sequence associated with a mobile station 120.

In another particular implementation, the base station 110 is further configured to apply a successive interference cancellation technique according to the associated sequence, after decoding. Thus, when a data packet from a mobile station 120 is decoded, the copies of the data packet are removed from the resources in which they were transmitted. It is then possible to resolve cases of collisions in one or more of these resources.

In the invention, it is also conceivable to have cases where the mobile stations 120 transmit the copies of data packets in cyclic transmission mode or in acyclic transmission mode.

When the transmission is cyclic, the base station 110 is further configured to be synchronized with the mobile stations 120. In one example, the base station 110 and the mobile stations 120 are synchronized to a clock of the system 100. In addition, the mobile stations 120 are further configured to set a predetermined cyclic transmission time. At each transmission cycle, the mobile stations 120 are thus authorized to transmit the copies of their data packets. In one example, the predetermined cyclic transmission time corresponds to a plurality of transmission time units, the duration of one time unit being chosen from 0.125 ms; 0.25 ms; 0.5 ms; or 1 ms. However, other values may be considered, as long as they are consistent with the establishment of latency-critical services.

When the transmission is acyclic, each mobile station 120 is further configured to carry out the transmission of the plurality of copies of the data packet within the framework of a plurality of time intervals (TTI for "transmission time interval") having a predetermined duration. In one example, the duration of the plurality of time intervals is chosen among 2 to 5 TTIs. However, other values may be considered, as long as they are consistent with the establishment of latency-critical services. Moreover, the base station 110 is further configured to store the data packets received over all the resources of the uplink channel 130. Finally, the base station 110 is further configured to perform the decoding, in a current time interval, based on the data packets received during the predetermined duration preceding the current time interval. By means of a sliding decoding mechanism, it is thus possible to take acyclic transmissions of the mobile stations 120 into consideration.

The invention also provides an additional mechanism to facilitate decoding in the cyclic transmission mode as well as in the acyclic transmission mode.

In the mechanism according to the invention, each mobile station 120 uses a unique transmission code which identifies a subsequent transmission from the mobile station 120. The unique transmission code is transmitted to the base station over reserved resources of the uplink channel 130. To implement this mechanism, each mobile station 120 is further configured to transmit the received transmission code to the base station 110, over the reserved resources of the uplink channel 130, prior to transmitting copies of the data packet. Furthermore, the base station 110 is further configured to receive at least one transmission code from the mobile stations 120, over the reserved resources of the uplink channel 130. Finally, the base station 110 is further configured to determine, based on the received transmission code, the mobile station 120 for which subsequent transmission is scheduled. Then the decoding is carried out as mentioned above.

In a first particular implementation of the mechanism, the transmission code associated with each mobile station 120 is predetermined. For example, the transmission code associated with each mobile station 120 is predetermined during commissioning of the mobile station 120 and base station 110. In this first implementation, the first memory 123 of each mobile station 120 stores the associated transmission code. In addition, the second memory 113 of the base station 110 stores the transmission code associated with each mobile station 120.

In a second particular implementation of the mechanism, the transmission code associated with each mobile station 120 is determined by the base station 110. In this implementation, the calculation unit 114 of the base station 110 is configured to determine the associated transmission code, for each mobile station 120. In addition, the transmission unit 111 of the base station 110 is configured to transmit the associated transmission code to each mobile station 120. Furthermore, the reception unit 122 of each mobile station 120 is further configured to receive the associated transmission code from the base station 110.

Figure 3:
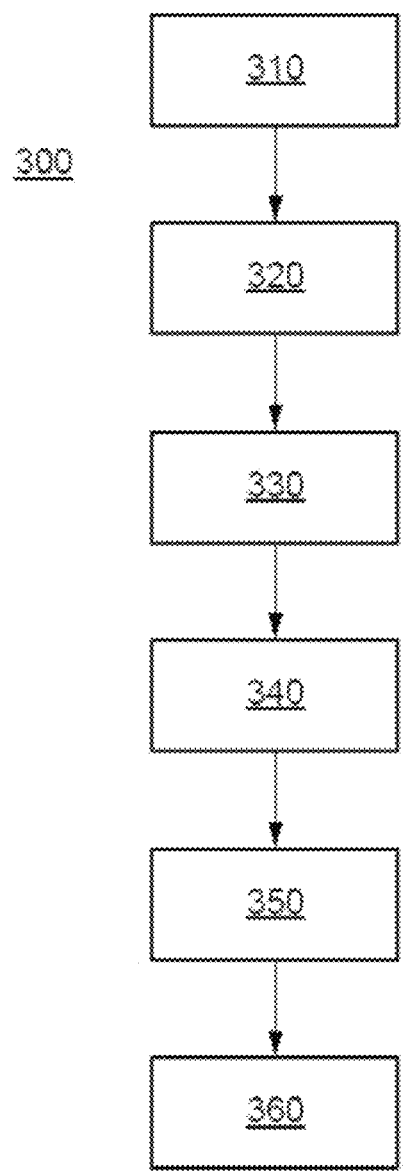
FIG. 3 shows a flowchart of a method according to the invention.

FIG. 3 illustrates a method 300 for wireless communication, according to the invention.

The method 300 first consists of providing, in step 310, at least one base station 110.

Next, in step 320, a plurality of mobile stations 120 is provided, in which each mobile station 120 is configured to establish a latency-critical service with the first base station.

Furthermore, in step 330, a contention-based multiple access uplink channel 130 without prior reservation of resources is provided, the uplink channel 130 comprising a plurality of resources 200.

Next, in step 340, each mobile station is associated with a specific sequence defining a portion of the plurality of resources of the uplink channel, as mentioned above.

Then, in step 350, a plurality of copies of a data packet is transmitted by each mobile station to the base station, according to the associated sequence, as mentioned above. The base station therefore receives from each mobile station a plurality of copies of a data packet according to their associated sequence.

Finally, in step 360, at least one resource is decoded by the base station for each mobile station, according to the associated sequence.

Figures 4A, 4B, 4C:
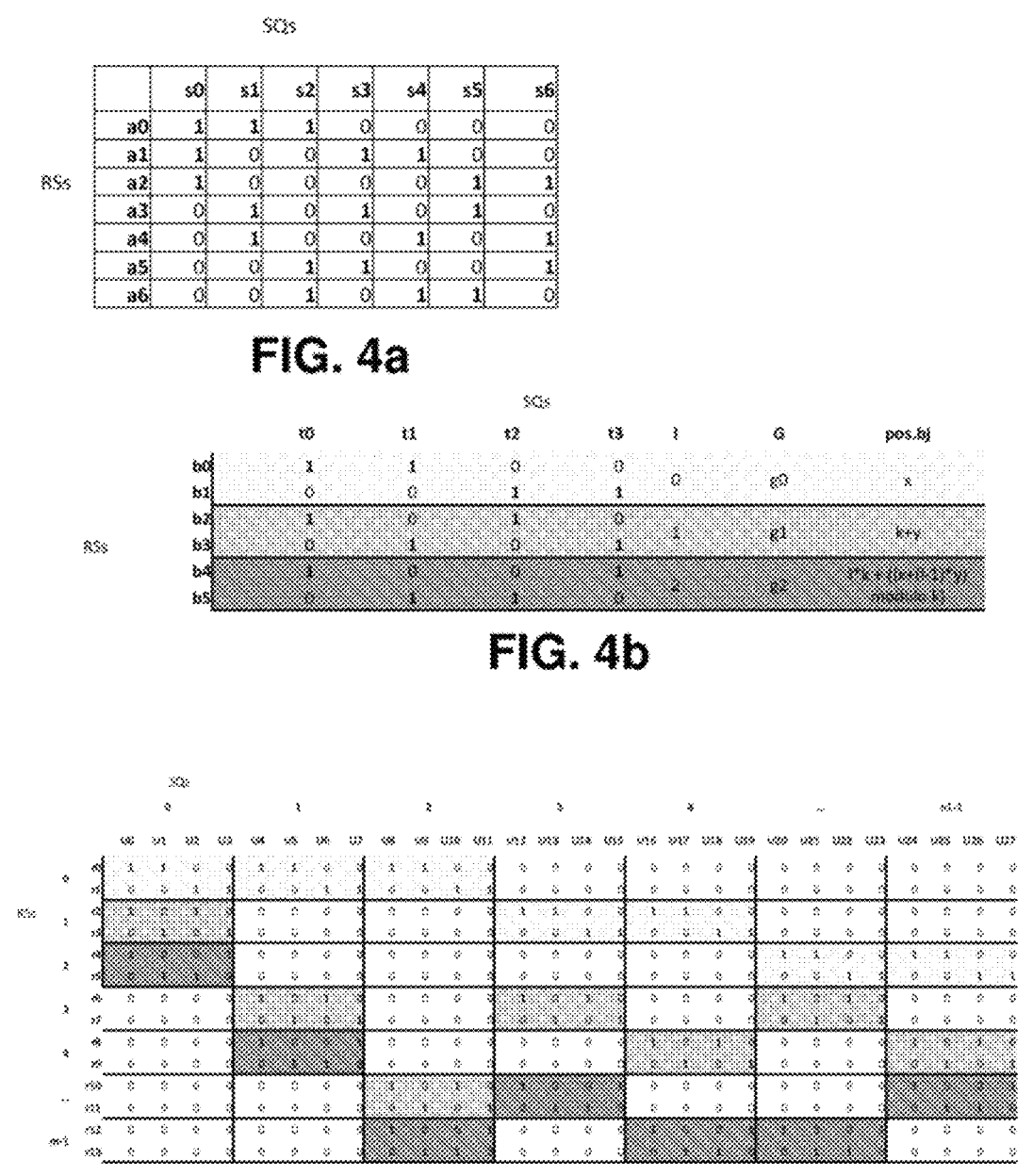

FIGS. 4*a*, 4*b* and 4*c* illustrate the steps of an exemplary embodiment of a sequence determination method specific to each mobile station. In one embodiment of the invention, this method is implemented by the base station to determine a specific sequence per mobile station in order to transmit it to them.

In another embodiment, these sequences are predetermined using this method, and are stored in memory in their respective mobile stations and in the base station.

This sequence determination method determines a number n1*n2 of sequences by the combination of a first set of sequences n1 comprising s resources selected among a number m=n/k of resources and satisfying the condition in which there is only one resource in common between two sequences, and a second set of sequences n2=k*k comprising s resources among a number k*s of resources, in order to compose sequences comprising s resources among n resources, where k is a prime number greater than or equal to s−1.

Thus, in a first step, a set P1={s0, . . . , sn1−1} of n1 sequences can be defined by exhaustively selecting sequences of chosen length s (s being the number of resources per sequence) satisfying at least one condition in which there is only one resource in common between two sequences. This set P1 may be formed from a small number of resources. This sequence P1 may also be determined by proceeding in the same manner as when constructing the set P2 of sequences as explained below.

In the example illustrated in FIG. 4*a*, 7 sequences s0 to s6 (SQs) are defined on a number of resources a0 to a6 (RSs) equal to 7. A sequence length equal to 3 (s=3) is selected in this exemplary embodiment. These sequences s0 to s6 of set P1 are chosen such that there is only one resource in common between two sequences of P1.

The "1"s represented in the table of FIG. 4*a* represent the positions of the resources of each sequence. For s0 for example, one can see vertically that the three resources associated with the sequence are the resources a0, a1 and a2. For s3, the associated resources are a1, a3 and a5.

In a second step, a prime number k, greater than or equal to s−1, is chosen for defining a second set P2 of resources satisfying the condition in which there is only one resource in common between two sequences. For this set of sequences P2={t0, . . . , tn2−1}, the number of sequences of length s is equal to n2=k*k. The s resources of each sequence are selected from k2=k*s resources among n resources.

The n2 sequences of P2 are determined as follows:

The k*s resources are grouped into s groups, denoted g0 to gs−1, of k resources. Any sequence of P2 is such that its l-th element is selected from the group gl (where l ranges from 0 to s−1). A sequence of P2 therefore occupies one and only one resource in each of the groups of k resources. In addition, a sequence of P2 must also satisfy the condition in which there is only one resource in common between two sequences. A sequence tj=(bj0, . . . , bjs−1) has its first element in group 0 at position bj0 between 0 and k−1, its next element in group 1 at position bj1 between k and 28k−1, etc . . . , its l-th element being in position bjl between l*k and l*k+l−1.

The k*k P2 sequences may be composed as follows.

Let the j-th sequence of P2 be such that j=x*k+y and 0≤j≤k*k−1 and where x and y have values between 0 and k−1. The l-th element of the j-th sequence of P2, l being between 0 and s−1, is equal to:

x (taking values from 0 to k−1), if l=0
k+y (y taking values from 0 to k−1), if l=1
l*k+((x+(l−1)*y) modulo k), for l between 2 and s−1 where h modulo k is the remainder of the Euclidean division of h by k. As k is a prime number, the sequences thus defined have one and only one resource in common.

Indeed, the following demonstration shows that if two elements are equal between two sequences, it means that these are the same sequence. We can therefore only have one element in common between two sequences.

To demonstrate this, we verify that if two distinct elements, l1 and l2, are equal between two sequences j and j', defined respectively by x and y, x' and y', then these two sequences are equal, i.e. x=x' and y=y'. Recall that (a modulo k)=(b modulo k) if and only if k divides a−b. Moreover, since k is prime, then k divides a*b if and only if k divides a or k divides b. Finally, if k divides a with an absolute value of a less than k, then a=0.

We consider four cases:

l1=0 and l2=1:
in this case, x=x' and k+y=k+y', therefore y=y' and therefore j=j'.

l1=0 and l2>1
in this case, x=x' and k divides x+(l2−1)*y−(x'+(l2−1)*y')=(l2−1)*(y−y'). Since k is prime, k must divide either (l2−1) or (y−y'). As the absolute values of these two numbers are smaller than k, then either l2−1=0 or y−y'=0. Since l2>1, y−y'=0 and therefore j=j'.

l1=1 and l2>1
in this case, y=y' and k divides x+(l2−1)*y−(x'+(l2−1)*y')=x−x'. Since k is prime, k must divide x−x'. As the absolute value of this difference is smaller than k, then x−x'=0 and therefore j=j'.

l1>1 and l2>1
in this case, k divides x+(l1−1)*y−(x'+(l1−1)*y') and k divides x+(l1−1)*y−(x'+(l2−1)*y'). Therefore k divides their difference (l1−l2)*y−(l1−l2)*y'=(l1−l2)*(y−y'). Since k is prime, k must divide either (l1−l2) or (y−y'). As the absolute values of these two numbers are smaller than k, then either l1−l2=0 or y−y'=0. Since l1 and l2 are different, then y−y'=0 and therefore y=y'. However, k divides x+(l2−1)*y−(x'+(l2−1)*y')=x−x'. Since k is prime, k must divide x−x'. As the absolute value of this difference is smaller than k, then x−x'=0 and therefore j=j'. This demonstrates that if two elements are equal in two sequences, then these two sequences are one and the same sequence. Thus two distinct sequences have at most one element in common.

As an example, illustrated in FIG. 4*b*, k is defined with a value equal to 2. We therefore have a set P2 of n2=k*k=4 sequences, represented vertically. As with set P1 illustrated in FIG. 4*a*, the s representing the number of resources per sequence is equal to 3. Values of "1" in a column indicate the positions of the resources of the corresponding sequence.

We thus see that the first element of sequence t0 is positioned at value x=0, meaning at b0 in group g0 corresponding to l=0.

The second element of sequence t0 is positioned at value k+y where y=0, therefore at value 2, i.e. at resource b2 in group g1 corresponding to l=1.

From one sequence to another, the value of x can vary every k sequences while the value of y varies from one sequence to another in each sequence, therefore diagonally as shown in FIG. 4b.

For the third element of sequence t0 of FIG. 4b, it is positioned at value $l*k+((x+(l-1)*y)$ modulo $k)$, meaning here (where l=2, k=2, x=0, and y=0) at value 4, i.e. resource b4.

From the sets of sequences P1 and P2 satisfying the condition in which there is only one resource in common between two sequences, it is then possible to form n1*n2 sequences of a number s of resources satisfying this same condition.

From each of the n1 sequences $si=(ai0, \ldots, ais-1)$ of P1, and of the n2 sequences $tj=(bj0, \ldots, bjs-1)$ of P2, we create n1*n2 sequences uij, of s resources among n, such that $uij=(ai0*k+bj0, \ldots, ail*kl*k+bjl, \ldots, ais-1*k-(s-1)*k+bjs-1)$.

Thus, the l-th element of uij, $ail*k-l**k+bjl$, is positioned in an ail-th subgroup of k elements of the n resources. With m=n/k, m groups of k elements are thus considered and denoted from g0 to gm-1.

Thus, the n1*n2 new sequences of s resources among n indeed satisfy the desired condition of only one common resource between two sequences. In effect, two sequences obtained in this manner can only have one subgroup in common. Resources used in common can only be in this subgroup and these sequences only use one resource per subgroup. They can therefore only have one resource in common.

FIG. 4c illustrates the combination of the n1 sequences of FIG. 4a and of the n2 sequences of FIG. 4b. We thus have n1*n2=7*4=28 sequences (U0 to U27) satisfying the desired condition. The number of resources m for the set of sequences P1 is such that m=n/k. With k=2, the n resources (r0 to r13) used to define the 28 sequences are then n=m*k=7*2=14.

We see in FIG. 4c that combining the n1 and n2 sequences according to the sequence determination method of this embodiment amounts to integrating each of the three groups g0 to g2 defined in P2 into the three positions of the resources defined in P1 for a sequence. We thus extend the number of sequences horizontally by a factor of 4 (=k*k) for a number of resources extended by a factor of 2 (=k).

This extension process can be repeated by combining the sequences defined by this new set P'1 of n1*n2 sequences again with the set P2 of sequences defined as explained above. We thus obtain (n1*n2)*n2 sequences for n*k resources which always satisfy the condition of two sequences having only one resource in common.

Using the same numerical examples as those illustrated in FIGS. 4a to 4c, we can then have (n1*n2)*n2=28*4=112 sequences of s=3 resources among n*k=14*2=28 resources.

This method therefore makes it possible to find in a simple manner a large number of sequences which satisfy the property of only one resource in common between two sequences, for a large number of resources.

The invention has been described and illustrated in the present detailed description and in the figures. However, the invention is not limited to the embodiments presented. Other variants and embodiments may be deduced and implemented by the skilled person upon reading the present description and the appended figures.

For example, the method 300 may be implemented using hardware and/or software elements. It may in particular be implemented as a computer program comprising instructions for its execution. The computer program may be stored on a storage medium readable by a processor. The medium may be electronic, magnetic, optical, or electromagnetic.

In particular, the invention may be implemented by devices comprising a processor and a memory. The processor may be a generic processor, a specific processor, an application-specific integrated circuit (ASIC), or a field-programmable gate array (FPGA).

The device may use one or more dedicated electronic circuits or a general-purpose circuit. The technique of the invention may be carried out on a reprogrammable computing machine (a processor or a microcontroller for example) executing a program comprising a sequence of instructions, or on a dedicated computing machine (for example, a set of logic gates such as an FPGA or an ASIC, or any other hardware module).

According to one embodiment, the device comprises at least one computer-readable storage medium (RAM, ROM, EEPROM, flash memory, or other memory technology, CD-ROM, DVD, or other optical disc medium, magnetic cassette, magnetic tape, magnetic storage disk, or other storage device, or other non-transitory computer-readable storage medium) with a computer program (in other words multiple executable instructions) stored thereon which, when executed on a processor or multiple processors, performs the functions of some embodiments of the invention, described above.

The invention claimed is:

1. A wireless communication system, comprising:
at least a first base station,
a second base station of the same type as the first base station,
a plurality of mobile stations, each mobile station being configured to establish a latency-critical service with the first base station, and
a contention-based multiple access uplink channel without prior reservation of resources, the uplink channel comprising a plurality of resources,
wherein:
the communication system is configured such that each mobile station is associated with a specific sequence, each sequence defining a portion of the plurality of resources of the uplink channel,
each mobile station is further configured to transmit, to the first base station, a plurality of copies of a data packet according to the associated sequence, and
the first base station is configured to decode, for each mobile station, at least one resource according to the associated sequence,
wherein:
the first base station is further configured to:
determine the associated sequence for each mobile station, and
transmit the associated sequence to each mobile station,
each mobile station is further configured to receive, originating from the first base station, the associated sequence,
the system is further configured such that, during a transfer of the uplink channel between the first base station and the second base station, for at least one mobile station, the first base station is further configured to transmit the associated sequence of the mobile station to the second base station.

2. The wireless communication system according to claim 1, wherein:
  each mobile station comprises a first memory storing the associated sequence, the associated sequence being predetermined, and
  the first base station comprises a second memory storing the associated sequence for each mobile station.

3. The wireless communication system according to claim 1, wherein the first base station is further configured to randomly determine the associated sequence of each mobile station.

4. The wireless communication system according to claim 1, wherein the first base station is further configured to determine the associated sequence of each mobile station according to a sequence determination method satisfying at least one condition in which there is only one resource in common between two sequences.

5. The wireless communication system according to claim 1, wherein:
  the first base station is further configured to be synchronized with the plurality of mobile stations, and
  the plurality of mobile stations is further configured to define a predetermined cyclic transmission time.

6. The wireless communication system according to claim 1, wherein each mobile station is further configured to define an acyclic transmission time, t and wherein:
  each mobile station is further configured to carry out the transmission of the plurality of copies of the data packet within a plurality of time intervals having a predetermined duration, and
  the first base station is further configured to:
    store the data packets received over all resources of the uplink channel, and
    perform the decoding, within a current time interval, based on the data packets received during the predetermined duration preceding the current time interval.

7. The wireless communication system according claim 1, wherein resources of the uplink channel are reserved and wherein:
  the first base station is further configured to:
    receive, originating from the plurality of mobile stations, over the reserved resources of the uplink channel, at least one transmission code, and
    determine, from the transmission code received, the mobile station for which the subsequent transmission is intended,
  each mobile station is further configured to:
    transmit the received transmission code to the first base station, over the reserved resources of the uplink channel, before transmission of the plurality of copies of the data packet.

8. The wireless communication system according to claim 1, wherein:
  the first base station is further configured to decode, for each mobile station, a combination of all or part of the resources of the associated sequence.

9. The wireless communication system according to claim 1, wherein:
  the first base station is further configured to apply a successive interference cancellation technique according to the associated sequence, after decoding.

10. A base station for establishing a latency-critical service with a plurality of mobile stations, each mobile station being configured to communicate with the base station via a contention-based multiple access uplink channel without prior reservation of resources, the uplink channel comprising a plurality of resources, wherein the base station comprises:
  a processor; and
  a non-transitory computer-readable medium comprising instructions stored thereon which when executed by the processor configure the base station to:
    decode, for each mobile station, at least one resource according to an associated specific sequence,
    the associated sequence defining:
      a portion of the plurality of resources of the uplink channel, and
      the resources on which each mobile station is further configured to transmit a plurality of copies of a data packet to the base station, and
    determine the associated sequence for each mobile station,
  a transmission unit configured to transmit the associated sequence to each mobile station,
  the instructions further configuring the base station being to transmit the associated sequence, for at least one of the mobile stations, to a second base station during a transfer of the uplink channel between the base station and the second base station.

11. The base station according to the previous claim 10, wherein the base station is further configured to determine the associated sequence for each mobile station according to a sequence determination method satisfying at least one condition in which there is only one resource in common between two sequences.

12. A wireless communication method implemented by a base station, for establishing a latency-critical service with a plurality of mobile stations, each mobile station being configured to communicate with the base station via a contention-based multiple access uplink channel without prior reservation of resources, the uplink channel comprising a plurality of resources, wherein the method comprises:
  associating each mobile station with a specific sequence defining a portion of the plurality of resources of the uplink channel,
  receiving, from each mobile station, a plurality of copies of a data packet according to the associated sequence,
  decoding, for each mobile station, at least one resource according to the associated sequence,
  determining the associated sequence for each mobile station,
  transmitting the associated sequence to each mobile station,
  transmitting the associated sequence, for at least one of the mobile stations, to a second base station during a transfer of the uplink channel between the base station and the second base station.

13. The method according to claim 12, wherein a sequence specific to each mobile station is determined according to a sequence determination method satisfying at least one condition in which there is only one resource in common between two sequences.

14. The method according to claim 13, wherein the sequence determination method determines a number $n1*n2$ of sequences by combining a first set of sequences $n1$ comprising s resources selected from a number $m=n/k$ of resources and satisfying the condition in which there is only one resource in common between two sequences, with a second set of sequences $n2=k*k$ comprising s resources among a number $k*s$ of resources in order to construct sequences comprising s resources among n resources, where k is a number prime greater than or equal to s-1.

* * * * *